(12) United States Patent
Kolblin et al.

(10) Patent No.: US 9,651,942 B2
(45) Date of Patent: May 16, 2017

(54) PROCESS CONTROL ARRANGEMENT FOR A PLANT OF PROCESS AND/OR AUTOMATION TECHNOLOGY CONNECTING A SUPERORDINATE COMMUNICATION PLANE WITH FIELDBUS SYSTEMS

(75) Inventors: Robert Kolblin, Lorrach (DE);
Eugenio Ferreira Da Silva Neto, Biel-Benken (CH); Michael Maneval, Schopfheim (DE); Jorg Reinkensmeier, Steinen (DE); Axel Poschmann, Basel (CH)

(73) Assignee: ENDRESS + HAUSER PROCESS SOLUTIONS AG, Reinach (CH)

( * ) Notice: Subject to any disclaimer, the term of this patent is extended or adjusted under 35 U.S.C. 154(b) by 1022 days.

(21) Appl. No.: 13/503,072

(22) PCT Filed: Oct. 7, 2010

(86) PCT No.: PCT/EP2010/064979
§ 371 (c)(1),
(2), (4) Date: Apr. 20, 2012

(87) PCT Pub. No.: WO2011/047964
PCT Pub. Date: Apr. 28, 2011

(65) Prior Publication Data
US 2012/0233370 A1 Sep. 13, 2012

(30) Foreign Application Priority Data
Oct. 21, 2009 (DE) .................. 10 2009 045 901

(51) Int. Cl.
*G06F 13/14* (2006.01)
*G05B 19/418* (2006.01)
(Continued)

(52) U.S. Cl.
CPC ..... *G05B 19/41855* (2013.01); *G05B 19/042* (2013.01); *G05B 19/4185* (2013.01);
(Continued)

(58) Field of Classification Search
CPC .......... G06F 13/14; G06F 13/42; G06F 15/16; G06F 13/362; G05B 19/042;
(Continued)

(56) References Cited

U.S. PATENT DOCUMENTS 6,446,202 B1 * 9/2002 Krivoshein ........ G05B 19/0421
700/1
6,449,715 B1 * 9/2002 Krivoshein ........ G05B 19/4185
700/1
(Continued)

FOREIGN PATENT DOCUMENTS

DE         10049049       12/2001
DE     102004 003605 A1   11/2004
(Continued)

OTHER PUBLICATIONS

'Applying Internet Management Standards to Fieldbus Systems' by Martin Knizak et al., copyright 1997, IEEE.*
(Continued)

*Primary Examiner* — Steven Snyder
(74) *Attorney, Agent, or Firm* — Bacon & Thomas, PLLC

(57) ABSTRACT

A process control arrangement (PKA), having a number of fieldbus systems (DP1, PA1, FH), especially different fieldbus systems (DP1, PA1, FH), and having a number of fieldbus interfaces (PAP1, PAP2, PAP3), wherein each of the fieldbus systems (DP1, PA1, FH) is connected to at least one of the fieldbus interfaces (PAP1, PAP2, PAP3), wherein the fieldbus interfaces (PAP1, PAP2, PAP3) serve for communication between the fieldbus systems (DP1, PA1, FH) and a communication plane (ET2) superordinated to the fieldbus
(Continued)

systems, only a first of the fieldbus interfaces (PAP1) is directly connected to the superordinated communication plane (ET2), and wherein the fieldbus interfaces (PAP1, PAP2, PAP3) are connected in series with one another beginning with the first of the fieldbus interfaces (PAP1).

11 Claims, 3 Drawing Sheets

(51) Int. Cl.
| | |
|---|---|
| H04L 12/46 | (2006.01) |
| G06F 13/362 | (2006.01) |
| H04L 12/24 | (2006.01) |
| G05B 19/042 | (2006.01) |
| H04L 12/40 | (2006.01) |

(52) U.S. Cl.
CPC ............ *G06F 13/14* (2013.01); *G06F 13/362* (2013.01); *H04L 12/4625* (2013.01); *H04L 41/0806* (2013.01); *G05B 2219/25012* (2013.01); *G05B 2219/25021* (2013.01); *G05B 2219/25142* (2013.01); *G05B 2219/25174* (2013.01); *G05B 2219/31121* (2013.01); *G05B 2219/31122* (2013.01); *G05B 2219/31124* (2013.01); *G05B 2219/31135* (2013.01); *G05B 2219/33226* (2013.01); *H04L 2012/4026* (2013.01); *H04L 2012/40208* (2013.01); *H04L 2012/40221* (2013.01); *Y02P 90/185* (2015.11)

(58) Field of Classification Search
CPC .......... G05B 19/4185; G05B 19/41855; G05B 2219/31135; G05B 2219/25012; G05B 2219/25021; G05B 2219/25174; G05B 2219/31121; G05B 2219/31122; G05B 2219/31124; G05B 2219/33226; G05B 2219/251; H04L 2012/40208; H04L 2012/40221; H04L 41/0806; H04L 2012/4026; H04L 12/4625; Y02P 90/185
USPC ........................... 710/105; 709/231
See application file for complete search history.

(56) References Cited

U.S. PATENT DOCUMENTS

| | | | | |
|---|---|---|---|---|
| 6,788,980 | B1 * | 9/2004 | Johnson | G05B 19/042 |
| | | | | 700/1 |
| 6,907,488 | B1 * | 6/2005 | Diehl | 710/305 |
| 7,269,465 | B2 * | 9/2007 | Esch et al. | 700/21 |
| 7,392,165 | B2 * | 6/2008 | Nixon et al. | 703/7 |
| 7,634,555 | B1 * | 12/2009 | Wainscott, Jr. | H04L 12/40006 |
| | | | | 700/19 |
| 8,190,728 | B1 * | 5/2012 | Wainscott, Jr. | H04L 12/40006 |
| | | | | 700/19 |
| 8,291,142 | B2 * | 10/2012 | Kuschke et al. | 710/105 |
| 8,433,827 | B2 * | 4/2013 | Biehler | G05B 19/41855 |
| | | | | 710/15 |
| 8,782,297 | B2 * | 7/2014 | Voss | H04L 12/283 |
| | | | | 700/276 |
| 9,276,996 | B2 | 3/2016 | Vetter et al. | |
| 9,483,035 | B2 * | 11/2016 | Buchdunger | G05B 19/0426 |
| 2002/0083364 | A1 * | 6/2002 | Christensen | G06F 11/2005 |
| | | | | 714/13 |
| 2002/0184410 | A1 * | 12/2002 | Apel | G06F 9/4411 |
| | | | | 710/5 |
| 2005/0091394 | A1 * | 4/2005 | Breinlinger et al. | 709/231 |
| 2008/0082296 | A1 * | 4/2008 | Robinson et al. | 702/182 |
| 2008/0126659 | A1 * | 5/2008 | Klofer et al. | 710/302 |
| 2008/0244104 | A1 * | 10/2008 | Clemente | H04L 12/40013 |
| | | | | 710/11 |
| 2008/0313254 | A1 * | 12/2008 | Hilemon | G05B 19/4185 |
| | | | | 709/200 |
| 2010/0211711 | A1 * | 8/2010 | Kuschke et al. | 710/110 |
| 2012/0041571 | A1 * | 2/2012 | Biehler | G05B 19/41855 |
| | | | | 700/19 |
| 2013/0041485 | A1 * | 2/2013 | Gunzert | G05B 19/4186 |
| | | | | 700/79 |
| 2013/0211547 | A1 * | 8/2013 | Buchdunger | G05B 19/0426 |
| | | | | 700/11 |

FOREIGN PATENT DOCUMENTS

| | | | |
|---|---|---|---|
| DE | 10 2009 027 949 A1 | | 1/2011 |
| DE | 10 2009 028 051 A1 | | 2/2011 |
| EP | 2109259 | | 10/2009 |
| GB | 2426355 A | | 11/2006 |
| JP | 2005016737 A | * | 1/2005 |
| WO | WO 2006/069691 A1 | | 7/2006 |
| WO | WO 2007/074105 A2 | | 7/2007 |

OTHER PUBLICATIONS

'High-Performance Wireless Ethernet' by Heegard et al., IEEE Communications Magazine, Nov. 2001.*
"Wireless Communications for Industrial Control and Monitoring" by Ciardello, IEE Computing & Control Engineering, Apr./May 2005.*
'Evolution potentials for fieldbus systems' by Dietmar Dietrich and Thilo Sauter, WFCS-2000, Sep. 6-8.*
'Modular Agent Design for Fieldbus Management' by Knizak et al., copyright 1999, IEEE.*

* cited by examiner

PROCESS CONTROL ARRANGEMENT FOR A PLANT OF PROCESS AND/OR AUTOMATION TECHNOLOGY CONNECTING A SUPERORDINATE COMMUNICATION PLANE WITH FIELDBUS SYSTEMS

TECHNICAL FIELD

The invention relates to a process control arrangement for a plant of process and/or automation technology, having a number of fieldbus systems, especially different fieldbus systems, and having a number of fieldbus interfaces, wherein each of the fieldbus systems is connected to at least one of the fieldbus interfaces.

BACKGROUND DISCUSSION

Field devices, which serve for registering and/or influencing process variables, are often applied in automation technology. Examples of such field devices are fill level measuring devices, mass flow measuring devices, pressure and temperature measuring devices, etc., which, as sensors, register the corresponding process variables, fill level, flow, pressure, or, respectively, temperature.

Field devices such as, for example, actuators, serve for influencing process variables. Thus, actuators in the form of e.g., valves influence the flow of a liquid in a pipeline section or, in the form of pumps influence the fill level in a container. A large number of such field devices are available from the firm, Endress+Hauser.

As a rule, field devices in modern manufacturing plants are connected to superordinated units (e.g. control systems, control units, etc.) via fieldbus systems (HART, Profibus, Foundation Fieldbus, etc.). These superordinated units serve, among other things, for process control, process visualizing, process monitoring as well as for startup and servicing of the field devices.

A number of fieldbus systems can be used in such a plant. The fieldbus systems installed can also be, in such case, of different types. The plant can, for example, have a cell (which corresponds to a section in the plant), in which communications are conducted by means of the Profibus protocol via one fieldbus system, and can exchange process relevant information in another cell by means of the Foundation Fieldbus protocol via another fieldbus system. A plant with a number of fieldbus systems of different types is described, e.g., in Offenlegungsschrift (laid-open German application) DE 10049049 A1. There, a process control network is connected to a number of fieldbus systems via a central control unit and via interfaces, which are, in each case, independent of one another.

Different requirements are placed on fieldbus systems by the user; on the one hand, process control and, on the other hand, plant monitoring, or plant visualizing. In such a plant, the totality of devices, which serve for process control or for plant monitoring and plant visualizing, and their arrangement is referred to as a process control arrangement. Process control, in such case, is performed by the plant operator via a process control system.

For plant monitoring, it can be required, for safety reasons, to provide an access to the fieldbus system, which access is separate from the process control system. Fieldbus interfaces having this functionality have already become known from the state of the art. For example, fieldbus systems are integrated in enterprise networks, which work based on Ethernet. By means of the fieldbus interfaces, process or field device data can thus be accessed from different areas of an enterprise. For worldwide communication, the enterprise networks can also be connected to public networks, e.g. the Internet.

For servicing the field devices, corresponding operating programs are necessary. These operating programs can run, for example, on a computer, which is integrated in a superordinated communication plane. An example is the FieldCare product of Endress+Hauser. The operating programs have different functionalities as regards plant monitoring (the so called asset management).

The accessing of the fieldbus from a superordinated communication plane such as, for example, a company network, to a fieldbus has so far been associated with a high cabling effort as well as with complicated data addressing. Currently, each fieldbus interface must be individually connected to the superordinated bus system by cable in order to connect the fieldbuses to the superordinated bus system. If a number of fieldbus interfaces are used in a plant, then each of these devices, in each case, must be assigned an individual address, for example, an IP address, in the superordinated communication plane. Additionally, plant information is not centrally queryable, but is distributed on the memory units of the respective fieldbus interfaces of the plant and is separately queryable from there.

Moreover, one type of fieldbus interface covers, for example, in each case, only one fieldbus type. Moreover, the devices must be individually configured as well as parametered and updated.

SUMMARY OF THE INVENTION

An object of the invention, thus, is to simplify the construction and operation of a plant of process and/or automation technology having a number of fieldbus systems.

The object is achieved according to the invention by features including that the fieldbus interfaces serve for communication between the fieldbus systems and a communication plane superordinated to the fieldbus systems, only a first of the fieldbus interfaces (PAP1) is directly connected with the superordinated communication plane (ET2), and the fieldbus interfaces are connected with one another in series beginning with the first of the fieldbus interfaces.

Through the proposed arrangement of the fieldbus interfaces, the cabling effort can be lessened, on the one hand, and, on the other hand, communication between the field devices and the superordinated communication plane is simplified. According to the invention, the superordinated communication plane must only be connected to a first of the fieldbus interfaces. The fieldbus interfaces can then be connected among one another starting from the first of the fieldbus interfaces. Therefore, only one address is required in the superordinated communication plane, which is issued to the first of the fieldbus interfaces, in order to communicate with a number of fieldbus systems. This lessens the effort in the superordinated communication plane for addressing signals to the field devices in the fieldbus systems.

Other fieldbus interfaces can be connected to or connectable with the first of the fieldbus interfaces in series. In this way, fieldbus systems of different types such as, for example, Profibus, Foundation Fieldbus, CANOpen, etc. can also be integrated. A concept of the invention is to utilize the fieldbus interfaces arranged in series for communication between the superordinated communication plane and the fieldbus systems. Therefrom the advantage arises that, for example, a switch for the communication of the fieldbus systems or for the communication of the fieldbus interfaces with the superordinated communication plane can be omitted.

The previously mentioned operating programs, which, for example, run in a computer unit of the superordinated communication plane, addresses only the first of the fieldbus interfaces, which are connected in series, in the case of possible queries. The first of the fieldbus interfaces can then, for example, forward the queries. Alternatively, the first of the fieldbus interfaces can contain a process image, from which requested data are accessed. Information concerning the fieldbus systems connected to the fieldbus interfaces and the field devices contained in these fieldbus systems can then be presented in this type and manner by the first of the fieldbus interfaces.

In an embodiment, the first of the fieldbus interfaces is connected in series with a second of the fieldbus interfaces, and the second of the fieldbus interfaces is connected to the first of the fieldbus interfaces in series, especially directly connected after the first of the fieldbus interfaces.

In an additional embodiment, each fieldbus interface following a preceding fieldbus interface is connected in series, especially directly connected, to the preceding fieldbus interface. The system of fieldbus interfaces produced thereby corresponds essentially to a so called daisy chain arrangement, in which the fieldbus interfaces are connected with one another in series. A signal designated for the following fieldbus interface is transmitted from the preceding interface to the following interface. The fieldbus interfaces can thereby be connected in the form of a chain with one another and signals can be transmitted between them.

In an additional embodiment, a preceding fieldbus interface is connected to a following fieldbus interface via a point to point connection. These two neighboring fieldbus interfaces along the chain of fieldbus interfaces are directly connected with one another through a so called direct connection.

In an additional embodiment, the fieldbus interfaces are considered topologically arranged along a line. In each case, two of the fieldbus interfaces can be connected, in such case, for example, to one another via a cable.

In an additional embodiment, at least two of the fieldbus systems are reciprocally line redundant fieldbus systems.

In an additional embodiment, the reciprocally line redundant fieldbus systems are a primary fieldbus system and a secondary fieldbus system, wherein the communication between the participants of the reciprocally line redundant fieldbus systems occurs, especially in a (disturbance free) normal operation, by means of the primary fieldbus system, and that, in the case, in which the communication between the participants occurs by means of the secondary fieldbus system, the accessing of one participant of the redundant fieldbus system by the superordinated communication plane occurs, especially automatically, via the fieldbus interface associated with the secondary fieldbus system. In this way, for example, a plant asset management system in the superordinated communication plane can observe switchings between the primary system and the secondary system.

In an additional embodiment, a signal designated for one of the fieldbus systems and sent from one participant of the superordinated communication plane is transmittable, at least sectionally, via the fieldbus interfaces connected in series. The signal can be, for example, a status query and/or a parameter setting for one of the field devices or the fieldbus interfaces. The signal can, for example, be in the form of a telegram.

In an additional embodiment, the signal is at least transmittable up to the fieldbus interface, which is connected to the fieldbus system, for which fieldbus interface the signal is designated. This can occur, for example, by addressing the signal to a designated field device or a designated fieldbus interface. The addressing can occur especially by means of the first of the fieldbus interfaces. The signals to be transferred are forwarded from one fieldbus interface to the next, until they reach their ultimate destination. The same naturally applies to signals, which should be transmitted from one of the fieldbus systems to the superordinated communication plane: The signals are transmitted from a fieldbus system from one of the fieldbus interfaces in each case to the preceding fieldbus interface. The first of the fieldbus interfaces then feeds the signals into the superordinated communication plane and/or transmits the signals to a display/service unit of the superordinated communication plane.

Thus, according to the invention, the totality of the fieldbus interfaces can be utilized in order to exchange signals between different fieldbus systems and a superordinated communication plane. In such case, each fieldbus interface can act simultaneously, for example, as a repeater. In order to avoid overlapping, special addressing methods are required in this type of networking.

In an additional embodiment, the fieldbus interfaces form a discrete fieldbus interfaces network, especially a discrete Local Area Network LAN, in which the fieldbus interfaces are connected with one another in series. The first of the fieldbus interfaces can be used, in such case, for the addressing of the signals and the fieldbus interfaces in the LAN. Such an addressing can occur, for example, according to the Ethernet standard and/or an Internet protocol.

In an additional embodiment, the fieldbus interfaces network is a self configuring network. In this way, an additional fieldbus interface can be integrated into the fieldbus interfaces network without requiring an intervention, for example, in the form of a configuration of the fieldbus interface to be inserted, by a user of the plant. The integration of the additional fieldbus interface can then rather occur through the fieldbus interfaces network itself, in that, for example, a new address is assigned to a fieldbus interface to be integrated. A corresponding program, for example, a host, which manages the addresses and is installed in one of the fieldbus interfaces, can be stored therefor in one of the fieldbus interfaces. An entering into or an exit from the fieldbus interfaces network of a fieldbus interface can thereby be automatically recognized and the allocation of data, tasks and resources can be distributed.

In an additional embodiment, a process image of the fieldbus systems connected to the fieldbus interfaces is stored in at least one of the fieldbus interfaces, which process image contains data from the participants of the fieldbus systems. The process image especially contains information concerning the fieldbus systems and the field devices located in the fieldbus systems. The process image therefor can be recorded in a memory unit. The memory unit can be provided, for example, in a single fieldbus interface, especially the first of the fieldbus interfaces, or can be distributed among the different fieldbus interfaces.

In an additional embodiment, the process image is queryable via the first of the fieldbus interfaces. The first fieldbus interface can have the process image stored, for example, in a memory unit or can retrieve the data of the process image stored in different memory units, which are distributed, for example, among a number of fieldbus interfaces.

In an additional embodiment, the associating of the signals to the fieldbus interfaces or the fieldbus systems is based on the stored process image. This enables a faster processing of the signals. Queries from the superordinated communication plane can be processed based on data stored in the process images. The process image can be updated independently thereof.

In an additional embodiment, the superordinated communication plane is a so called open or closed bus, especially an Ethernet.

In an additional embodiment, the fieldbus system is a fieldbus, especially a FOUNDATION Fieldbus, a Profibus or a HART bus.

In an additional embodiment, at least one of the fieldbus interfaces includes a first connection, which serves to connect the fieldbus interface either to the superordinated communication plane or to a preceding fieldbus interface; a second connection, which serves to connect the fieldbus interface to the fieldbus system; and a third connection, which serves to connect the fieldbus interface to an additional fieldbus interface, especially a fieldbus interface of identical construction. With the proposed connections it is possible to connect the fieldbus interfaces in series with one another in a simple manner. Moreover, such a fieldbus interface can also be used to make a connection to the superordinated communication plane. Alternatively, the fieldbus interface, which follows the first of the fieldbus interfaces, can serve as one of the fieldbus interfaces connected in series. The proposed fieldbus interface can thus fulfill different functions depending on the type of connection.

In an additional embodiment, at least the first of the fieldbus interfaces includes an electrical and/or electronic unit, which serves to produce a tappable signal via the third connection; the produced signal corresponds essentially to a signal received via the first connection or represents such a received signal. As mentioned above, such a fieldbus interface can be connected to the superordinated communication plane. In this case, a signal, which is designated for one of the field devices in one of the fieldbus systems, is received from the superordinated bus system via the first connection of the first of the fieldbus interfaces. By means of one electrical and/or electronic unit provided in the first of the fieldbus interfaces, the signal is then decoded and provided with a fieldbus interfaces network internal address, so that the signal is sent within the fieldbus interfaces network to the fieldbus interface, which is connected to the fieldbus system, in which the field device is located, for which fieldbus system the signal is designated. By means of the fieldbus interface, the so coded signal is then converted to a signal, which is readable in the fieldbus system in which the field device is located.

In an additional embodiment, the first connection serves as an input and the third connection as an output for the signals transmitted by the superordinated communication plane to the fieldbus system.

In an additional embodiment, the fieldbus interface is connectable to a third connection of an additional, essentially identically constructed fieldbus interface via the first connection.

In an additional embodiment, each of the fieldbus interfaces is connected to exactly one fieldbus system.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
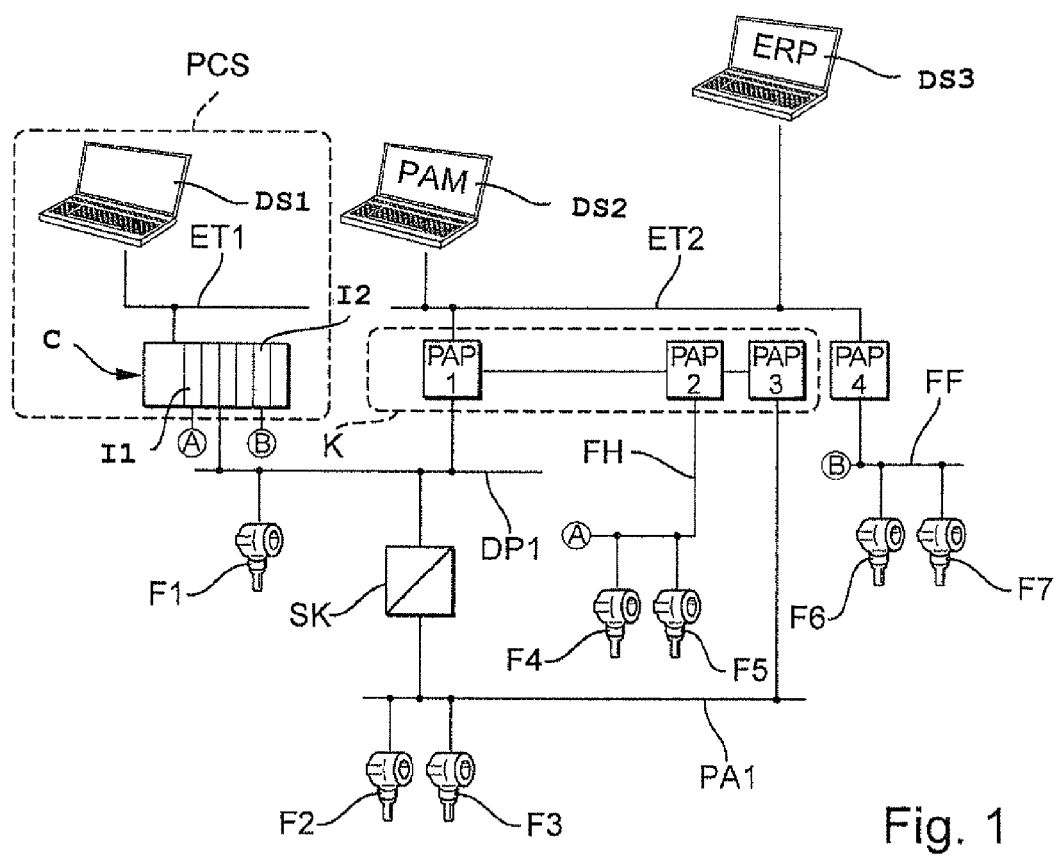
FIG. 1 is a schematic representation of the construction of a process control arrangement.

FIG. 1 shows a schematic representation of a process control arrangement PKA of a plant of process automation technology. The process control arrangement PKA includes a first bus system ET1, which connects the units of the process control system PCS. In such case, the process control system PCS includes a display/service unit DS1 and a control unit C. The process control system PCS is used by a plant operator for process control of the plant.

First bus system ET1 is connected to a first fieldbus system DP1 via an interface of control unit C. First fieldbus system DP1 is a Profibus DP fieldbus system, to which field devices, symbolically represented by the field device F1, are connected. Profibus DP fieldbus system DP1, in turn, is connected, via a non transparent segment coupler SK, to Profibus PA fieldbus system PA1, to which field devices F2, F3 are likewise connected. Control unit C includes additional interfaces I1, I2 for signal transmission to a second fieldbus system FH, or an additional fieldbus system FF. Here, second fieldbus system FH is a HART fieldbus system and third fieldbus system FF is a Foundation Fieldbus fieldbus system. Fieldbus systems DP1, PA1, FH, FF in the example of an embodiment shown in FIG. 1 are, in such case, different types of fieldbus systems, i.e. different fieldbus protocols are used in each respective fieldbus system for signal transmission.

Additionally, a second bus system ET2 is provided, which, in the example of an embodiment shown, connects two display/service units DS2, DS3 with one another. Display/service units DS2, DS3 serve for plant monitoring and visualizing of the different fieldbus systems DP1, PA1, FH, FF. Second bus system ET2 forms, in such case, a communication plane superordinated to fieldbus systems DP1, PA1, FH, FF. Second bus system ET2 can be, for example, a company network. The different fieldbus systems DP1, FH, PA1 can be accessed from second bus system ET2 via the fieldbus interfaces PAP1, PAP2, PAP3, which are connected in series. In such case, operating programs such as, for example, a plant asset management, enables the diagnosis of field devices F1, F2, F3, F4, F5 and visualization of the respective fieldbus system.

In the process control arrangement PKA shown in FIG. 1 the intraplant process control system PCS is isolated from the company network, i.e. second bus system ET2 is not directly connected to first bus system ET1. This can, among other things, contribute to increased plant safety, since a servicing and, thus, an influencing, of the process flow by unauthorized users can be prevented.

In order, nevertheless, to enable a querying of a field device status of one of the field devices F1, F2, F3, F4, F5, for example, a first fieldbus interface PAP1 is provided, via which second bus system ET2 is connected to first fieldbus system DP1. First fieldbus interface PAP1 thereby enables the connection of second bus system ET2 to subordinated fieldbus systems DP1, PA1, FH. The fieldbus interfaces PAP2, PAP3 can then be applied for communication between superordinated second bus system ET2 and fieldbus systems FH, PA1. The fieldbus interfaces PAP2, PAP3 are connected in series with the first fieldbus interface PAP1.

Second bus system ET2 is thus connected to a number of different fieldbus systems DP1, FH, PA1 via fieldbus interfaces PAP1, PAP2, PAP3, which are connected in series. A fieldbus interfaces network K is formed by the item by item chaining of fieldbus interfaces PAP1, PAP2, PAP3. In the example of an embodiment illustrated in FIG. 1 each of the fieldbus interfaces PAP1, PAP2, PAP3 is connected to one fieldbus system DP1, FH, PA1. In such case, only the first of fieldbus interfaces PAP1 is directly connected to second bus system ET2. The first of fieldbus interfaces PAP1 enables, consequently, as mentioned above, communication between the superordinated communication plane, here second bus system ET2, and fieldbus systems DP1, FH, PA1. Second fieldbus interface PAP2, which is connected in series with first fieldbus interface PAP1, enables the communication between superordinated bus system ET2 and a second fieldbus system FH. A signal transmission from second bus system ET2 to second fieldbus system FH occurs via the first of the fieldbus interfaces PAP1, which forwards the signals to second of the fieldbus interfaces PAP2, whence the signals are fed to second fieldbus system FH. Connected in series, the third of the fieldbus interfaces PAP3 enables communication between second bus system ET2 and a third fieldbus system PA1. A signal transmission from the superordinated communication plane to third fieldbus system PA1 occurs via the first and the second of the fieldbus interfaces PAP1, PAP2 to the third of fieldbus interfaces PAP3 and, finally, from the third of fieldbus interfaces PAP3 to the third fieldbus system PA1. Conversely a transmission of signals, for example, from field device F4, F5, from third fieldbus system PA1 to the superordinated communication plane, here second bus system ET2, likewise occurs via fieldbus interfaces PAP1, PAP2, PAP3, which are connected in series.

The addressing of the signals, which, for example, are present in the form of telegrams, to fieldbus interfaces PAP1, PAP2, PAP3 and/or fieldbus systems DP1, FH, PA1 can occur by means of the first of fieldbus interfaces PAP1. For this purpose, the first of fieldbus interfaces PAP1 can contain a process image of the three fieldbus systems DP1, FH, PA1 and perform the addressing of the signals internally, i.e. provide the telegrams with the address of that one of fieldbus interfaces PAP1, PAP2, PAP3, which is connected to fieldbus system DP1, FH, PA1, in which field device F1, F2, F3, F4, F5, for which the signals are designated, is located.

First fieldbus system DP1 can be serviced via the interface of control unit C as well as via the first of fieldbus interfaces PAP1. Control unit C is a master class 1 in first fieldbus system DP1 and first fieldbus interface PAP1 is a master class 2 in first fieldbus system DP1. The control unit can perform cyclic queries in first fieldbus system DP1 and first fieldbus interface PAP1 can perform acyclic queries in first fieldbus system DP1. As mentioned above, first fieldbus system DP1 is connected to Profibus PA fieldbus system PA1 via the non-transparent segment coupler SK. Therefore, for example, no diagnostic information concerning the Profibus PA segment can be jointly read from Profibus DP segment by means of the first of the fieldbus interfaces PAP1. The third of the fieldbus interfaces PAP3 is, however, connected to the Profibus PA segment. Due to the series connection of fieldbus interfaces PAP1, PAP2, PAP3 it is possible, consequently, to transmit diagnostic information from the Profibus PA segment, for example, to a display/service unit DS2, DS3 of second bus system ET2. Conversely, from display/service unit DS2, DS3 in the superordinated communication plane, here the superordinated communication plane of second bus system ET2, through the arrangement of fieldbus interfaces PAP1, PAP2, PAP3 of the invention via a single address (namely that of first of fieldbus interfaces PAP1) in the superordinated communication plane, here the second bus system, the Profibus PA as well as the Profibus DP segment can be operated and/or, for example, diagnostic information can be read out from field device F2, F3 of Profibus PA fieldbus system PA1. The corresponding signals can be transmitted via fieldbus interfaces PAP1, PAP2, which are connected in series, and non-transparent segment coupler SK can be bypassed.

The second bus system ET2 is connected, moreover, to an additional fieldbus interface PAP4, which is connected to Foundation Fieldbus fieldbus system FF. Foundation Fieldbus fieldbus system FF, in turn, is connected to interface I2 of control unit C. Additional fieldbus interface PAP4 is connected to second bus system ET2 in parallel with the first of the fieldbus interfaces PAP1 and is integrated in second bus system ET2 via its own address.

First and second bus systems ET1, ET2 can be hierarchically equal communication planes, which use the Ethernet protocol.

Figure 2:
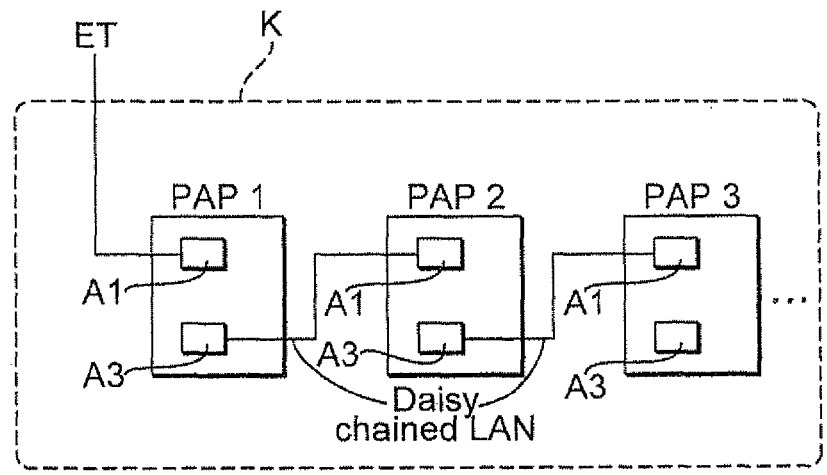
FIG. 2 is a schematic representation of an arrangement of fieldbus interfaces.

FIG. 2 shows an arrangement of fieldbus interfaces PAP1, PAP2, PAP3. In the example of an embodiment shown in FIG. 2, fieldbus interfaces PAP1, PAP2, PAP3 are connected with one another in a so called daisy chain.

First of fieldbus interfaces PAP1 includes a first connection A1, via which it is connected to superordinated communication plane ET, for example, second bus system ET2 of FIG. 1. First fieldbus interface PAP1 additionally includes a second connection, not shown, which serves to connect first fieldbus interface PAP1 to a fieldbus system, for example, first fieldbus system DP1 of FIG. 1. Via a third connection A3, the first of the fieldbus interfaces PAP1 is connected to a second of fieldbus interfaces PAP2. This second of fieldbus interfaces PAP2 likewise has three connections. Via first connection A1, second fieldbus interface PAP2 is connected to first fieldbus interface PAP1, while it is connected to third fieldbus interface PAP3 via the third connection A3. By means of third connection A3, second fieldbus interface PAP2 is connected to the first connection A1 of third fieldbus interface PAP3. Via a second connection (not shown), second fieldbus interface PAP2 is connected to a fieldbus system, for example, second fieldbus system FH of FIG. 1. Via its second connection (not shown), third fieldbus interface PAP3 is likewise connected to a fieldbus system, for example, the third fieldbus system PA1 of FIG. 1.

The signals sent from superordinated communication plane ET to one of the field devices in a fieldbus system are at least transmitted to the first of the fieldbus interfaces PAP1. In first fieldbus interface PAP1, these signals are addressed and forwarded to that one of the fieldbus interfaces PAP2, PAP3, which is connected to the fieldbus system, in which the corresponding field device is located, for which the signals are intended. The signals are then transmitted via the chain of fieldbus interfaces PAP1, PAP2, PAP3 to the fieldbus interface, which is connected to the fieldbus system, for which the signal was designated. Fieldbus interfaces network K can naturally also include more than the three fieldbus interfaces shown in FIG. 2.

It is, for example, also possible to connect additional fieldbus interfaces in series with fieldbus interfaces PAP1, PAP2, PAP3. If, for example, another fieldbus interface is linked to fieldbus interfaces network K, then this new fieldbus interface is automatically assigned an address in fieldbus interfaces network K. No new IP address must be assigned by superordinated communication plane ET. Possible information for, or querying of, field devices from superordinated bus system ET are only sent to the first of the fieldbus interfaces PAP1, which then further processes these data.

Connections A1, A3 of the fieldbus interfaces can be Ethernet connections.

Figure 3:
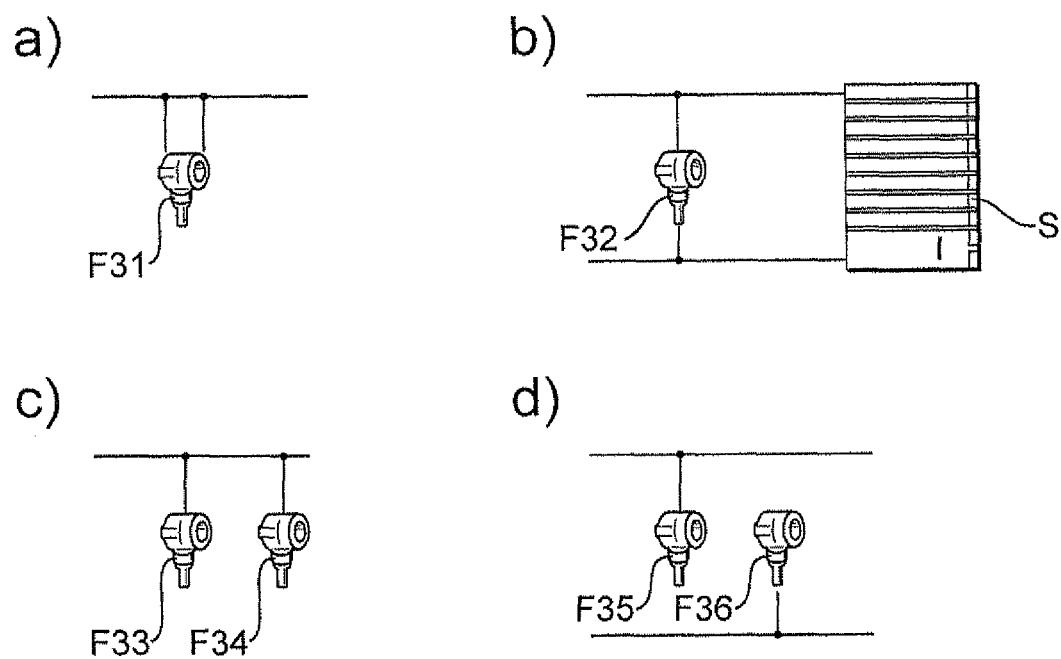
FIG. 3a), FIG. 3b), FIG. 3c) and FIG. 4d): are different redundant arrangements of field devices in a fieldbus system.

FIG. 3 shows various redundant embodiments of a fieldbus system having field devices F31, F32, F33, F34, F35, F36. In order to assure the continuing operation of the plant in the case of a disturbance, safety measures such as, for example, a redundant design of the fieldbus system or fieldbus devices, are necessary. Such a redundancy can be achieved in different ways:

FIG. 3 a) shows a field device F31 registered in a fieldbus system via two different addresses.

FIG. 3 b) shows a field device F32 connected to two independent fieldbus systems. Field device F32 has a different address in each of the fieldbus systems. The two fieldbus systems are addressed by control unit C. If this is the case, one speaks of line redundancy.

FIG. 3 c) shows two field devices F33, F34 of the same type in a fieldbus system, wherein each of field devices F33, F34 has its own fieldbus address.

FIG. 3 d) shows two field devices F35, F36 of the same type in two fieldbus systems, which are independent of one another.

Figure 4:
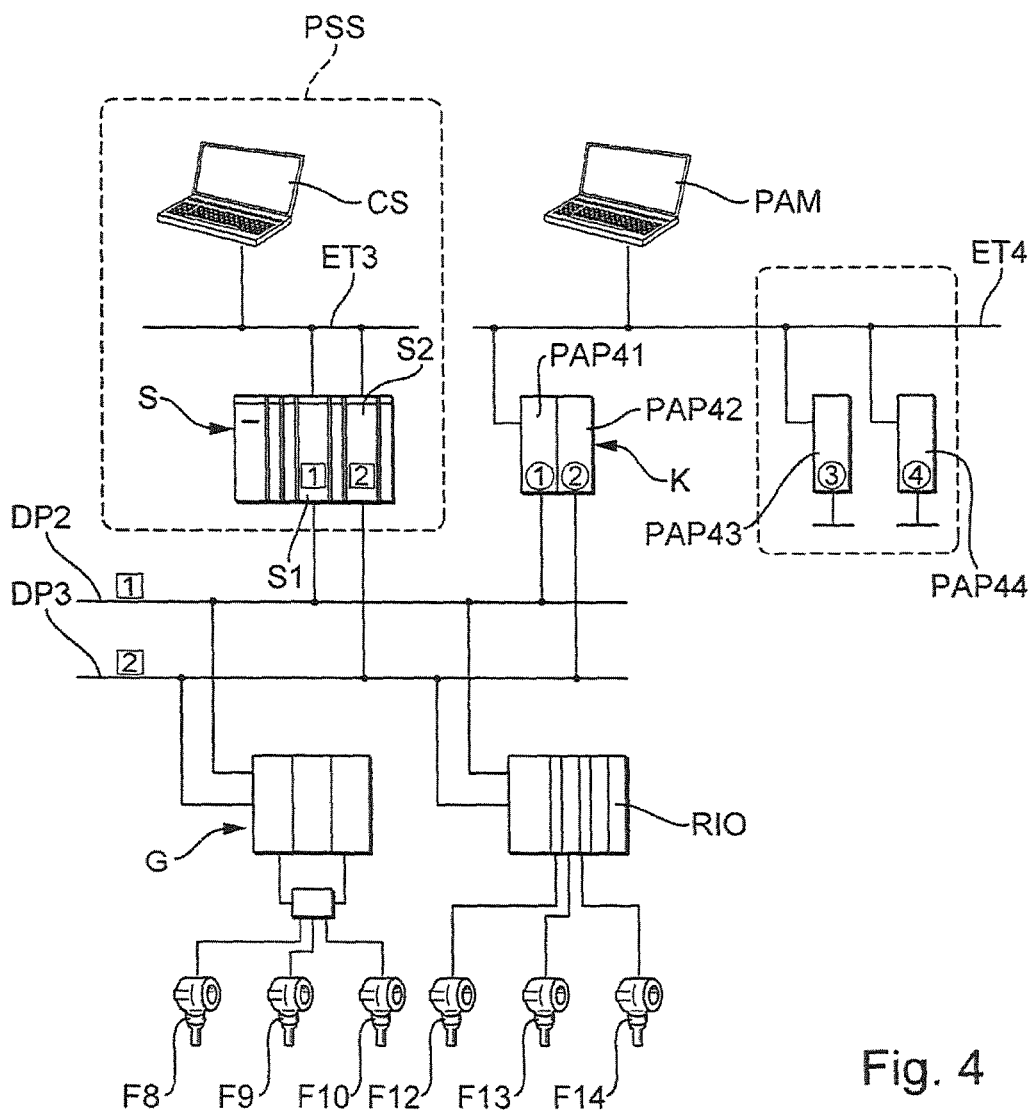
FIG. 4 is a schematic representation of a process control arrangement having reciprocally redundant fieldbus systems.

FIG. 4 shows schematically the construction of a process control arrangement PKA having redundant (line redundant) fieldbus systems DP2, DP3. Control unit C of process control system PCS has two interfaces I1, I2, which are connected, respectively, to fieldbus systems DP2, DP3. The two fieldbus systems DP2, DP3 are, in such case, independent of one another. The redundancy resides, in such case, in a doubled embodiment of a Profibus DP segment.

First interface I1 of control unit C is connected to the first embodiment of Profibus DP segment DP2 while second interface I2 of control unit C is connected to the second embodiment of Profibus DP segment DP3. In the example of an embodiment shown in FIG. 4, a gateway G, in this case, a Profibus DP/PA segment coupler SK and a remote I/O unit RIO are connected via fieldbus systems DP2, DP3. Additional participants, not shown, can also be connected to the fieldbus systems DP2, DP3. Connected to remote I/O unit RIO are field devices F12, F13, F14, which communicate according to the HART-standard.

As described above, it is known for purposes of diagnosis and/or visualization to provide an additional access to fieldbus system DP2, DP3. The additional access is separate from process control system PCS.

For such purpose, for example, two fieldbus interfaces PAP43, PAP44 can be used, which are connected separately from one another to a superordinated communication plane, in this case, a second bus system ET4. One of these fieldbus interfaces PAP43 is connected to the first of the redundant fieldbus systems DP2, for example, the fieldbus system currently in operation. The other fieldbus interface PAP44 is then connected to the redundant fieldbus system DP3, which comes into use in the case of a disturbance of first fieldbus system DP2.

However, this has the disadvantage that operating programs, such as, for example, plant asset management PAM systems, connected via such a fieldbus interface PAP44 neither monitor switchings in the redundant system DP3, nor fit the corresponding network topology and address paths.

Therefore, it can be advantageous for PAM systems connected to superordinated communication system ET4 to be able to keep current relative to redundance switchings. For such purpose, as shown in FIG. 4, two fieldbus interfaces PAP41, PAP42 can be used, which are connected with one another in series as shown in FIG. 2. Fieldbus interfaces PAP41, PAP42 monitor, respectively, fieldbus system DP2 and makes information relative to redundant switchings available to the PAM system. The PAM system can automatically adapt to corresponding updates in the network topology and addresses. In this way, the PAM system, even when it is not integrated in process control system PCS, can be kept current in the case of redundant construction of the fieldbus systems DP2, DP3.

The invention claimed is:

1. A process control arrangement for a plant of process and/or automation technology, having:
   a superordinated communication plane;
   a number of fieldbus systems; and
   a number of fieldbus interfaces serving as plant access points (PAPs), wherein:
   said fieldbus interfaces form a wired discrete Local Area Network (LAN), in which said fieldbus interfaces are connected with one another in series and said fieldbus interfaces network is a self-configuring network,
   each of said fieldbus systems is connected to at least one of said fieldbus interfaces;
   each of said fieldbus interfaces serve for communication between said fieldbus systems and the superordinated communication plane;
   only a first of said fieldbus interfaces is directly connected to said superordinated communication plane;
   said fieldbus interfaces are connected in series with one another beginning with the first of said fieldbus interfaces; and
   the superordinated communication plane only issues an address to the first of said fieldbus interfaces in order to communicate with the number of fieldbus systems through the first of said fieldbus interfaces.

2. The process control arrangement as claimed in claim 1, wherein:
   the first of said fieldbus interfaces is connected to a second of said fieldbus interfaces in series; and
   the second of said fieldbus interfaces is connected in series to the first of said fieldbus interfaces, directly connected after the first of said fieldbus interfaces.

3. The process control arrangement as claimed in claim 1, wherein:
   each fieldbus interface following a preceding fieldbus interface is connected in series, directly connected, to the preceding fieldbus interface.

4. The process control arrangement as claimed in claim 1, wherein:
   said fieldbus interfaces are topologically considered arranged along a line.

5. The process control arrangement as claimed in claim 1, wherein:
   at least two of said fieldbus systems are reciprocally line redundant fieldbus systems.

6. The process control arrangement as claimed in claim 5, wherein:
   said reciprocally line redundant fieldbus systems are a primary fieldbus system and a secondary fieldbus system;

communication between participants of said reciprocally line redundant fieldbus systems occurs by means of the primary fieldbus system, in a disturbance free normal operation; and in a case, in which communication between the participants occurs by means of the secondary fieldbus system, said superordinated communication plane accesses, especially automatically accesses, one of the participants of said redundant fieldbus system via the fieldbus interface associated with the secondary fieldbus system.

7. The process control arrangement as claimed in claim 1, wherein:

a signal intended for one of said fieldbus systems and sent from a participant of said superordinated communication plane is transmittable, at least sectionally, via the serially connected fieldbus interfaces.

8. The process control arrangement as claimed in claim 1, wherein:

a process image of said fieldbus systems connected to said fieldbus interfaces is at least partially stored in at least one of said fieldbus interfaces; and the process image contains data of the participants of said fieldbus systems.

9. The process control arrangement as claimed in claim 1, wherein:

at least one of said fieldbus interfaces has:

a first connection, which serves to connect said fieldbus interfaces either with said superordinated communication plane or a preceding fieldbus interface;

a second connection, which serves to connect said fieldbus interface to said fieldbus system; and a third connection, which serves to connect said fieldbus interface to an additional fieldbus interface of equal construction.

10. The process control arrangement as claimed in claim 9, wherein:

at least said first of said fieldbus interfaces has an electrical and/or electronic unit, which serves to produce a signal tappable via said third connection; and the produced signal corresponds to a signal received via said first connection or represents such a received signal.

11. The process control arrangement as claimed in claim 10, wherein:

said first connection serves as input and said third connection serves as output for signals transmitted from said superordinated communication plane to said fieldbus system.

* * * * *